W. G. SWIFT.
ANTIRATTLING DEVICE FOR AUTOMOBILES OR OTHER VEHICLES.
APPLICATION FILED NOV. 6, 1913.

1,199,219.

Patented Sept. 26, 1916.

WITNESSES
Herbert K. Allard.
George A. White Jr.

INVENTOR
Walter G. Swift
BY
Arthur F. Arrington
ATTORNEY

UNITED STATES PATENT OFFICE.

WALTER G. SWIFT, OF PROVIDENCE, RHODE ISLAND.

ANTIRATTLING DEVICE FOR AUTOMOBILES OR OTHER VEHICLES.

1,199,219.  Specification of Letters Patent.  Patented Sept. 26, 1916.

Application filed November 6, 1913. Serial No. 799,454.

*To all whom it may concern:*

Be it known that I, WALTER G. SWIFT, a citizen of the United States, residing at Providence, in the county of Providence and State of Rhode Island, have invented certain new and useful Improvements in Anti-rattling Devices for Automobiles or other Vehicles, of which the following is a specification.

My invention relates to improvements in anti-rattling devices for use on automobiles or other vehicles.

The object of my improvement is to provide a simple and inexpensive device adapted to be applied to the brake-rods or other movable elements of an automobile to prevent undue vibration or rattling thereof.

The invention is fully described in the following specification, illustrated by the accompanying drawings, in which like letters of reference designate like parts.

Figure 1:
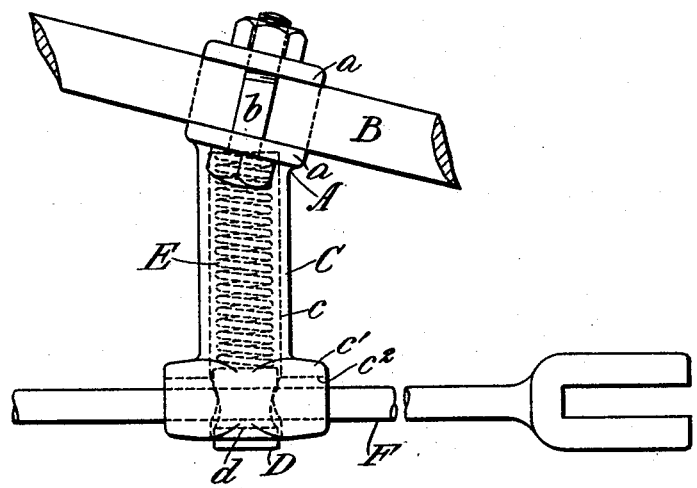
Figure 2:
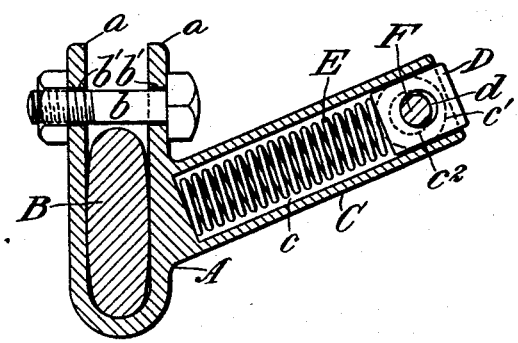

In the drawings:—Figure 1 is a plan view of my new device showing it attached to a part of the running-gear of the automobile and arranged to restrain the brake-rod from lateral displacement; Fig. 2 is a sectional elevation of the device.

Referring to the drawings, my new device is preferably made in the form of a clamp-member A having spring jaws $a$, $a$ adapted to straddle some rigid part of the automobile running-gear. As here shown the jaws $a$, $a$ are fitted to the radius-rod B which usually extends from the forward part of the chassis of the automobile to the rear axle-housing on each side of the running-gear. The clamp A is secured to the radius-rod B by a binder-screw or bolt $b$ extending through the holes $b'$, $b'$ at the ends of the jaws $a$, $a$. It will be understood, however, that any other support might be used for the clamp A, the one designated being most convenient on account of its usual location in close proximity to the brake-rods.

Extending from the side of the clamp-member A is an arm C, preferably of cylindrical form and provided with a longitudinal bore or cored-out pocket $c$. The end of the arm C is formed with a cross-piece $c'$ having a bore or hole $c^2$ extending at right-angles to the bore $c$. Fitted loosely to the end of the bore $c$ is a sliding plunger or plug D formed with a laterally-extending bore or hole $d$. The hole $d$ in the plug D may be of the same or of slightly less diameter than the cross-bore $c^2$ in the arm C and is adapted to register or aline therewith. Inserted in the pocket $c$ of the arm C is a coiled spring E arranged to normally force the plug D outwardly in the bore $c$ of the arm, but adapted to be compressed to bring the hole $d$ in line with the hole $c^2$.

As before stated it is usual in automobile construction to arrange the brake-rods for the brakes of the rear wheels in close relation to the longitudinally-extending radius-rods which take the thrust of the rear axle. Fig. 1 illustrates the radius-rod B running at a slight angle to the adjacent brake-rod F and this arrangement is used on a well known type of car now in extensive use. The approved form of my invention here shown is designed especially for this type of construction and it will be observed from Fig. 1 that the arm C is set at an angle to the clamp A to adapt its cross-piece $c'$ to aline axially with the brake-rod F. The arm C is also inclined upwardly from the clamp A as shown in Fig. 2, to bring the bore $c^2$ of the cross-piece $c'$ into position to receive the brake-rod F which is located slightly above the radius-rod B. These details, however, are merely a matter of design and construction and any other suitable form of clamp-member could be used in accordance with the requirements of the structure of the vehicle to which it is applied.

The new device is applied to use in the following manner: With the spring E in place in the pocket $c$ of the arm C the plug D is pressed inwardly to bring its hole $d$ into alinement with the cross-bore $c^2$. The brake-rod F having been uncoupled at the turnbuckle or other connecting joint, its end is inserted through the holes $c^2$ and $d$, it being noted that these latter are somewhat larger in diameter than the rod to provide an easy fit. The brake-rod F is now connected up again and the clamp A is adjusted along the radius-rod B and secured in position with the parts in relation as illustrated in Fig. 1. It will be observed that since the tendency of the spring E is to force the plug D outwardly in the bore of the arm C, the brake-rod F will be pressed against the outer wall of the cross-bore $c^2$ of the arm, as illustrated most clearly in Fig. 2. In other words, the spring E serves to hold the brake-rod F pressed against the side of the bore $c^2$ in the cross-piece $c'$ and thus restrains it from undue lateral vibration or side play. At the same time the tension of the spring E is not sufficient to cause the plug D to bind the rod to prevent its longitudinal movement, but, on the contrary, its movement in this direction under action of the brake-lever is unimpeded to any appreciable extent. Furthermore, I have found that by packing the spring-pocket $c$ with grease the same can be made to feed slowly into the holes $c^2$ and $d$ so that the bearing for the brake-rod is kept constantly lubricated and a much smoother action results. Owing to irregularities in the brake-rod, which is never exactly straight and true, the movement of the rod through the holes $c^2$ and $d$ sets up a slight play or plunger-like motion of the plug D, and it is this action that causes the grease to ooze out from the pocket $c$ and spread to the cross-bore in the plug and arm.

It will be seen from the above that my invention provides a simple and efficient means for supporting and steadying the brake-rod or other similar part to prevent vibration and rattling thereof. Besides eliminating noise and rattle, my new arrangement also has the advantage of preventing undue wear on the brake-lever pins and other connections, and hence its use increases the durability of these parts.

As before stated my new device might be arranged for attachment to other parts of the car besides the radius-rods, and it could also be used to support more than one rod, as in the case where double brakes are employed, or for other purpose which might occur. Various modifications might be made in the form and construction of my new device without departing from the spirit or scope of the invention.

Therefore, without limiting myself to the precise embodiment shown and described, what I claim is:—

1. In an anti-rattling device for automobiles or other vehicles, the combination with the running-gear thereof, of a clamp-member adapted to be secured thereto, an arm extending from the clamp-member formed with a bearing for encircling a brake-rod or similar part of the vehicle to permit said rod to slide longitudinally therein, and resiliently-operated means carried by said arm and adapted to bear against the rod and force it against the bearing to prevent lateral vibration or chattering thereof.

2. In an anti-rattling device for automobiles or other vehicles, the combination with a clamp-member adapted to be secured to the running-gear of the vehicle, of a bearing on said member having a bore adapted to receive a brake-rod or similar part of the vehicle to allow said rod to slide longitudinally therein, means carried by said member to bear against the side of the rod, and resilient means for forcing said bearing-means against the rod to restrain the latter from lateral vibration or rattling.

3. In an anti-rattling device for automobiles or other vehicles, the combination with a clamp-member adapted to be secured to the running-gear of the vehicle, of a bearing on said member having a bore through which the brake-rod is adapted to slide longitudinally, slidable-means in the bearing adapted to bear against the side of the brake-rod, and resilient means to force said sliding-means against the brake-rod to restrain the latter from lateral vibration or rattling.

4. In an anti-rattling device for automobiles or other vehicles, the combination with a clamp-member adapted to be attached to the running-gear of the vehicle, said member formed with an arm having a longitudinal bore and a cross-bore extending at right-angles thereto, a plunger-plug mounted in said longitudinal bore and formed with a lateral bore adapted to register with the cross-bore of the arm, and a spring in the longitudinal bore of the arm arranged to slide the plug to cause it to impinge upon a brake-rod or similar part extending through the cross-bores of the arm and plug.

5. In an anti-rattling device for automobiles or other vehicles, the combination with a clamp-member adapted to be attached to the running-gear of the vehicle, said member formed with an arm having a longitudinal bore and a cross-bore extending at right-angles thereto to adapt it to receive a brake-rod or similar part, means mounted to slide in the longitudinal bore, and a spring in said longitudinal bore arranged to operate the sliding-means to force it against the brake-rod to bind the latter in the cross-bore to prevent lateral vibration thereof.

In testimony whereof I affix my signature in presence of two witnesses.

WALTER G. SWIFT.

Witnesses:
GEORGE F. BOHL,
HERBERT K. ALLARD.